(12) United States Patent
Tretiakoff et al.

(10) Patent No.: US 6,862,074 B2
(45) Date of Patent: Mar. 1, 2005

(54) PORTABLE DEVICE FOR THE PHOTOGRAPHING OF BOOK PAGES

(76) Inventors: Oleg B. Tretiakoff, 9500 S. Ocean Dr., Islandia 2, Jensen Beach, FL (US) 34957; Andrea B. Tretiakoff, 9500 S. Ocean Dr., Islandia 2, Jensen Beach, FL (US) 34957

( * ) Notice: Subject to any disclaimer, the term of this patent is extended or adjusted under 35 U.S.C. 154(b) by 42 days.

(21) Appl. No.: 10/341,422

(22) Filed: Jan. 14, 2003

(65) Prior Publication Data

US 2003/0133085 A1 Jul. 17, 2003

(51) Int. Cl.[7] .................. G03B 27/04; G03B 27/68; G03B 27/70
(52) U.S. Cl. .................. 355/25; 355/66; 355/82
(58) Field of Search .................. 355/25, 65, 66, 355/82

(56) References Cited

U.S. PATENT DOCUMENTS 3,635,557 A * 1/1972 Alderton ............... 355/65
5,619,302 A * 4/1997 Wu ..................... 355/25
5,636,006 A * 6/1997 Wu ..................... 355/75

* cited by examiner

Primary Examiner—Rodney Fuller
(74) Attorney, Agent, or Firm—Jacobson Holman PLLC

(57) ABSTRACT

Two transparent plates constitute with each other an angle variable from about 60 to 120 degrees along their common edge. A book to photograph is opened at the chosen pages and placed sitting on said common edge. A photographic camera is attached near the free edge of one of the plates through a supporting element in such a way that the optical axis of the camera stays perpendicular to the one plate. A first planar mirror, which has one edge in common with the common edges of the transparent plates, is maintained exactly in the middle of the angle formed by the transparent plates but can be folded against the one plate. A second mirror which has one edge in common with the one plate near its free edge, is maintained perpendicular to the reference position of the first mirror.

8 Claims, 3 Drawing Sheets

PORTABLE DEVICE FOR THE PHOTOGRAPHING OF BOOK PAGES

FIELD OF THE INVENTION

The present invention concerns a portable device allowing photographing of two adjacent pages anywhere in a book while opening the book by an angle lower than 120 degrees.

BACKGROUND OF THE INVENTION

Optical devices designed to allow to photograph any page of a book while opening the book by an angle as small as possible have been proposed before.

An example of such a device, allowing photographing of both pages of a book at a time, is described for example in German Patent DE 35 46 404. In this patent, a number of implementations of transparent plates combined with mirrors are described. In some implementations, the number of mirrors used is as high as nine. The German Patent does not cite portability and ease of use as goals of the invention. There is also no indication on how to aim the camera at the center of book pages of variable sizes.

SUMMARY OF THE INVENTION

When compared to the present invention, the devices of the prior art lack:

portability, because of the number, size and locations of the mirrors used in their various implementations and the absence of means to reduce their bulk for transportability, and simple means to adjust the position of the camera to aim its optical axis at the center of various size pages, particularly if they have to be used by blind individuals.

The operating principles of a device in conformity with the present invention are similar to the operating principles of the device described in French Patent Application serial number 01 16 172, filed on Dec. 4, 2002. Although, while in the previous design, the book had to be turned over to photograph successively two opposite pages, in the present invention one only needs to fold a mirror against one of the transparent plates carrying the book to switch between opposite pages. Another benefit of the new design is that the optical distance between the page surface and the camera lens surface is practically constant when the camera is aimed at the center of pages of books of different sizes.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

The present invention concerns a portable device allowing photographing of any page of a book while opening the book by an angle from about 60 to 120 degrees, therefore without damaging it. The device is designed in such a way that it can be used by blind people without external help, in order to become the first part of a portable book reading machine.

Figure 1:
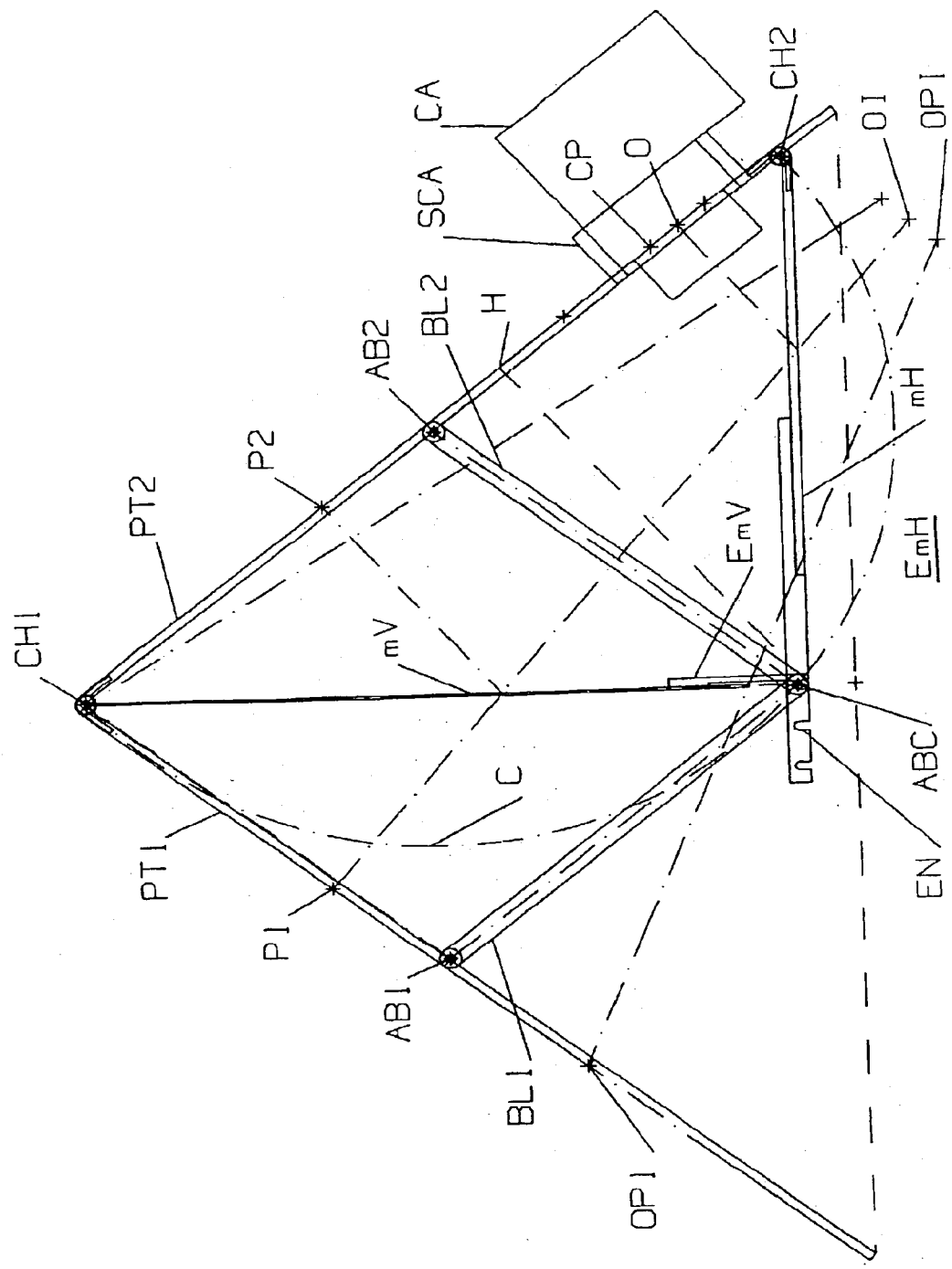
FIG. 1 is a schematic illustration of a positioning of two transparent plates and two mirrors for photographing two pages of a book.
Figure 2:
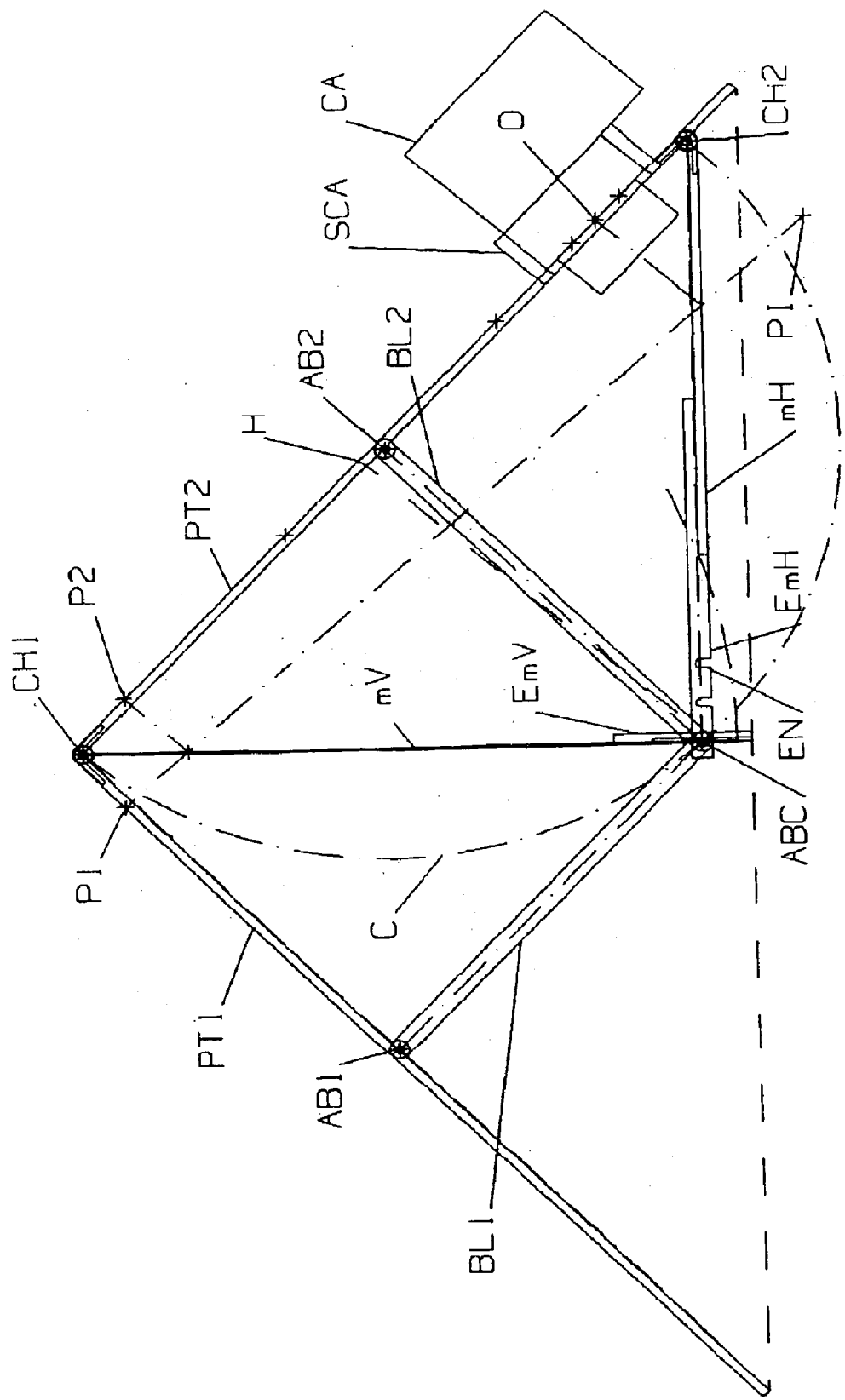
FIG. 2 is a schematic illustration of an alternate positioning of two of the transparent plates and one of the mirrors.
Figure 3:
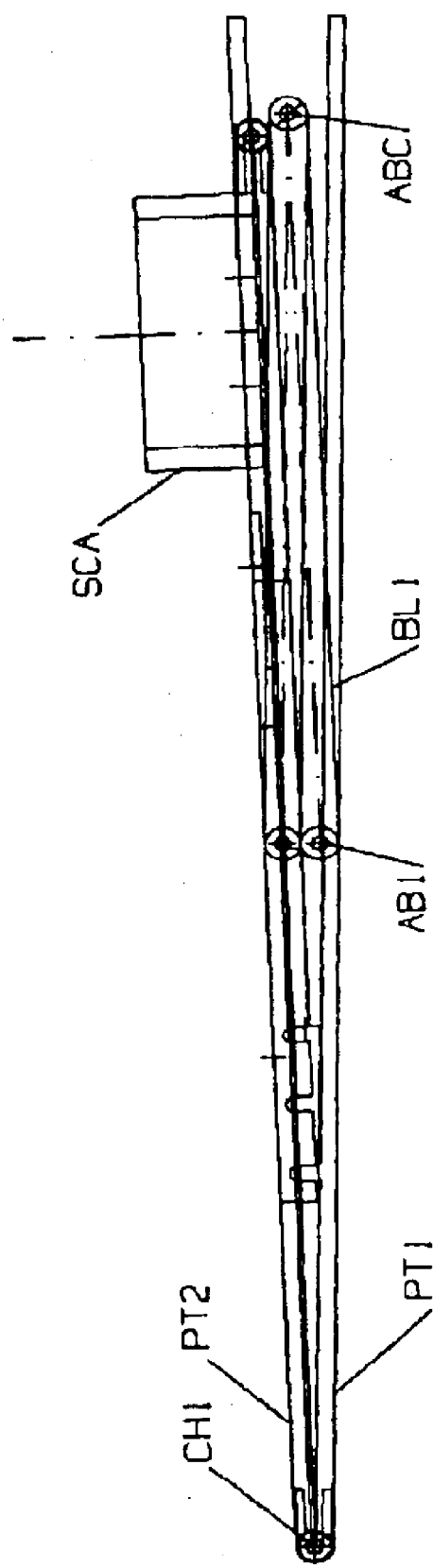
FIG. 3 shows the plates and mirrors folded for transport.

A preferred embodiment of a device in conformity with the present invention is shown in FIGS. 1 to 3. Dimensions of the objects represented parallel to the plane of the drawing will be called lengths or widths, dimensions perpendicular to the plane of the drawing will be called heights.

Two transparent plates PT1 and PT2, both perpendicular to the plane of the drawing, are held together by two hinges CH1 attached to the front and the rear of their top edges, in such a way that the middle section of said edges is left free to hold an opened book sitting on their top between the hinges. Said plates can rotate with respect to each other along the common axis of said hinges.

Four short cylindrical front and rear rods AB1 and AB2, also perpendicular to the plane of the drawing are respectively attached to the front and rear edges of the plates PT1 and PT2 in such a way that the plane defined by the axis of the rods AB1 and the axis of the hinges CH1 is parallel to the plate PT1 and the plane defined by the axis of the rods AB2 and the axis of the hinges CH1 is parallel to the plate PT2. The axis of the rods AB1 and AB2 are at the same distance from the axis of the hinges CH1.

Two levers BL1 are attached at one end to the front and rear rods AB1 in such a way that they can rotate around the common axis of said rods, and two identical levers BL2 are attached at one end to the front and rear rods AB2 in such a way that they can rotate around the common axis of said rods. The free ends of the levers BL1 and BL2 are attached to a rod ABC perpendicular to the plane of the drawing in such a way that they can rotate around the axis of the rod ABC.

The axis of the rods AB1 and AB2 are at the same distance from the axis of the rod ABC, this distance being equal to the distance between the axis of the rods AB1 or AB2 from the axis of the hinges CH1.

The axis of the rod ABC is therefore maintained exactly in the middle of the angle between the plates PT1 and PT2 when this angle varies. During this motion, the axis of the rod ABC stays on a cylinder C which has the same axis as the rod AB2. The plates PT1 and PT2 being of the same length, when they stand along their bottom free edge on an horizontal plane surface, the plane defined by the axis of the rod ABC and the axis of the hinges CH1 stays vertical when the angle between the plates PT1 and PT2 varies.

The rod ABC comprises three cylindrical sections: two sections of the same diameter as the rods AB1 and AB2 at each end and a middle section of a larger diameter and of the same height as the transparent plates PT1 and PT2.

A planar rectangular mirror mV, extending perpendicular to the plane of the drawing, and of the same height as the plates PT1 and PT2, is attached by its upper edge at the axis of the hinges CH1 in such a way that it can freely rotate around said axis and can be folded against the plate PT2. When the plates PT1 and PT2 stand along their bottom free edge on an horizontal plane surface, the mirror mV hangs naturally in a vertical position halfway between said plates. In order to allow the mirror mV to occupy this position, a flat area has been cut in the central section of the rod ABC at a distance from the rod axis equal to half the thickness of the mirror mV, allowing said mirror to rotate freely between its vertical position against the rod ABC and its folded position against the plate PT2.

Two identical extension plates EmV extending parallel to the plane of the drawing are attached to the front and rear bottom edges of the mirror mV in such a way that the mirror mV stays in the plane defined by the axis of the rod ABC and the axis of the hinges CH1, when said extension plates are sitting against the rod ABC on its side facing the plate PT2. Thanks to said extensions, the mirror mV is maintained in the middle of the angle defined by the plates PT1 and PT2, even if said mirror is too short to reach the rod ABC when said angle is decreased and therefore the distance between the axis of the rod ABC and the axis of the hinges CH1 increases.

A plane rectangular mirror mH, extending perpendicular to the plane of the drawing, and of the same height as the mirror mV and the plates PT1 and PT2, is attached by its right edge to the plate PT2 near the lower edge of said plate by two hinges CH2 attached to the front and rear angles of the plate PT2 and of the mirror mH, in such a way that the plane defined by the common axis of the hinges CH2 and the common axis of the hinges CH1 is parallel to the surface of the plate PT2 and contains the axis of the rods AB2. The distance between the axis of the hinges CH2 and the axis of the rods AB2 is chosen to be equal to the distance between the axis of the hinges CH1 and the axis of the rods AB2. Therefore, the plane defined by the axis of the rod ABC and the axis of the hinges CH2 remains perpendicular to the plane defined by the axis of the rod ABC and the axis of the hinges CH1 when the angle between the plates PT1 and PT2 varies.

The mirror mH is kept parallel to the plane defined by the axis of the rod ABC and the axis of the hinges CH2 by means of two extension plates EmH extending parallel to the plane of the drawing, attached to the front and rear edges of the mirror mH near its free left edge, when said extension plates are resting on top of the end sections of the rod ABC.

Thanks to said extensions, the mirror mH is maintained perpendicular to the mirror mV, the mirror mH being by design too short to reach the rod ABC, in order to prevent the lower edge of the mirror mV from bumping into the left edge of the mirror mH when the mirror mV is rotated to be folded against the plate PT2.

A photographic camera CA is attached to the transparent plate PT2 by means of a support SCA in such a way that the optical axis of the camera is perpendicular to the plate PT2 halfway between the front and the rear of said plate and cuts the external surface of said plate at a point O. The camera lens can protrude through and below the inside surface of the plate PT2 through a circular hole cut in said plate.

When the mirror mV is in its vertical reference position, a light ray coming from the point O along the camera optical axis will reach, after successive reflections on the mirror mH and the mirror mV, a point P2 on the external surface of the plate PT2 located symmetrically from the point O with respect to the projection H of the intersection of the reflecting surface of mirrors mH and mV on the external surface of the plate PT2. The point H and therefore the point P2 aimed at by the camera move closer to the inside border of the page of a book sitting on the plates PT1 and PT2 when the angle between said plates increases, and moves towards its outside border when said angle decreases, thus allowing the camera to be aimed at the center of various size books simply by varying said angle.

When the mirror mV is folded against the plate PT2, a light ray coming from the point O along the camera optical axis will reach, after a single reflection on the mirror mH a point P1 located on the external surface of the plate PT1 symmetrically from the point P2 with respect to the plane defined by the axis of the rod ABC and the axis of the hinges CH1, which is a plane of symmetry for the plates PT1 and PT2. If one calls OI the image of the point produced by the mirror mH, a light ray coming from the point O along the camera optical axis will follow the line OI-P1 after a single reflection on the mirror mH.

When an opened book is placed sitting on the top of the plates PT1 and PT2, one can photograph its right page when the mirror mV is hanging freely in its vertical position, or its left page when the mirror mV is temporarily kept folded against the plate PT2.

The minimal length, in the drawing plane, of the mirrors mV and mH is defined by the widest page to be photographed and the maximum optical opening of the camera lens. If one calls CP the intersection of the top edge of the circle representing the opening pupil of the lens with a plane parallel to the plane of the drawing containing the center O of this pupil, and one calls OPI the image of CP produced by the mirror mH, and one calls OP1 the intersection of the external border of the page sitting against the plate PT1 with said plane, the intersection of the line OP1-OPI with the mirrors mV and mH defines their minimal length. The corresponding opening angle of the book is shown on FIG. 1.

The maximum value of the angle defined by the plates PT1 and PT2, and therefore the smallest page at which center the camera can be aimed, is defined by the need to be able to fold the mirror mV against the plate PT2 without having its lower edge bumping against the left edge of the mirror mH. The corresponding opening angle of the book is shown on FIG. 2.

The constraints cited above explain the need for the extension plates EmH and EmV to keep the mirrors mV and mH in their reference positions perpendicular to each other, both for the smallest and the largest angle between the plates PT1 and PT1, corresponding respectively to the smallest and the largest book page width which can be centered in the camera field of view.

In the embodiment of the invention shown in FIGS. 1 to 3, the horizontal extension plates EmH carry on their bottom edge three slots EN defining three fixed values of the opening angle of the book corresponding to three fixed values of their page width, easy to retrieve for example by a blind user.

If a continuous adjustment of said angle is desired, the extension plates EmH will carry longer slots defining only the minimum and maximum values of said angle and intermediate positions will be kept by tightening against the extension plates two screws fitted on the threaded end sections of the rod ABC.

If an electrically controlled adjustment of said angle is desired, the extension plates EmH will carry on their lower edge a single long rack each, defining only the minimum and maximum values of said angle and intermediate positions being kept by gears driven by two stepping motors attached to the end sections of said rod.

If the camera used is a digital camera providing a video output representing the content of the image in the camera field of view, this video output can be analyzed to detect the position of the page borders with respect to the camera field of view, therefore providing the information needed to adjust by means of electrical signals and automatically, both the centering of the camera optical axis on the page and the camera focal length (zoom) to match the page size and the camera field of view.

To fold down the device in its transport position, one follows these steps:

remove the camera from its position on the plate PT2, fold the mirror mV against the plate PT2, fold the mirror mH against the mirror mV and the plate PT2 by lifting up the extension plates EmH, fold the plate PT1 as close as possible to the mirror mH, the mirror mV and the plate PT2, by flattening the top and bottom angles of the lozenge constituted by the transparent plates and the levers BL1 and BL2.

FIG. 3 shows the device completely folded for easy transport.

In summary, two transparent plates PT1 and PT2 constitute with each other an angle variable from about 60 to 120 degrees along their common edge. The book to photograph is opened at the chosen pages and placed sitting on said common edge. A photographic camera CA is attached near the free edge of the plate PT2 through a supporting element SCA in such a way that the optical axis of the camera stays perpendicular to the plate PT2.

A planar mirror mV, which has one edge in common with the common edges of the transparent plates, is maintained exactly in the middle of the angle formed by the transparent plates but can be folded against the plate PT2. A mirror mH which has one edge in common with the plate PT2 near its free edge, is maintained perpendicular to the reference position of the mirror mV.

By successive reflections on the mirrors mH, then mV, the optical axis of the camera aims at the page of the book maintained against the plate PT2 when the mirror mV is in its reference position, and by reflection only on the mirror mH it aims at the opposite page of the book maintained against the plate PT1, when the mirror mV is held folded against the plate PT2. The points at which the optical axis of the camera are aimed at, move closer to the inside border of the pages when the angle between the plates PT1 and PT2 increases, and move closer to their outside border when this angle decreases.

The transparent plates and mirrors are held in their operating positions by two sets of levers BL1 and BL2 pressed against the lateral edges of the plates and constitute together with the plates two deformable lozenges. The mirrors and the angle between the plates PT1 and PT2 are maintained by means of two extension levers EmV and EmH resting on a rod ABC which constitutes one summit of the lozenges. Hinges attached on the common edges of the groups of plates PT1-mV-PT2 and mH-PT2 allow both the variation of the angle between the transparent plates and folding the whole device for easy transport.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A portable, foldable device to photograph pages of a book as part of a portable book reading machine for blind people, said device comprising:

a frame having two transparent plates with a common pivot edge of the frame constituting an angle between the two transparent plates of about 60 and 120 degrees to hold the book sitting on top of said frame with two adjacent pages being applied against an external surface of said frame, a first mirror positioned in a middle of the angle defined by said plates in a first position and said first mirror being folded against one of said two plates in a second position, a second mirror having an edge close to a free edge of one of said transparent plates and pivoted with respect to said one transparent plate to constitute an angle comprised between about 60 and 30 degrees with said one transparent plate, said second mirror extending perpendicular to said first mirror when said first mirror is in said first position, and a photographic camera positioned near the edge of the one transparent plate close to said second mirror and said photographic camera being carried by the one transparent plate with an optical axis of the camera extending perpendicular to the one transparent plate carrying the camera and being aimed by successive reflections on said second mirror and then said first mirror at the page of a book placed against the one transparent plate carrying the camera, and by reflection only on said second mirror at the page of the book placed against the other transparent plate when said first mirror is in the second position.

2. Device according to claim 1, wherein said transparent plates rotate around an axis near and parallel to the common edge in such a way that a point of the book page at which the camera is aimed moves towards an inside border of the page when the angle defined by said transparent plates increases, and towards an external border of the page when said angle decreases, allowing said point to be placed at the center of the page of books of various sizes.

3. Device according to claim 1, wherein said mirrors are positioned by a rod whose axis is kept in a plane of symmetry of the angle defined by said transparent plates, said mirrors being able to rest on said rod while remaining perpendicular to each other with one of said mirrors occupying a position parallel and near to said plane of symmetry.

4. Device according to claim 3, wherein said rod comprises four levers of same length arranged in two groups of two levers each respectively placed against the front and rear edges of said transparent plates in such a way that the levers constitute with said plates two identical lozenges, one in the front, the other in the rear of said plates, said lozenges being held together by said rod in such a way that said levers rotate:

on one hand around the axis of said rod at one summit of said lozenges, on the other hand around the common axis of two short rods attached to the front and rear edges of both transparent plates, constituting two other summits of said lozenges, thus allowing an aperture angle of said lozenges to vary according to a value of the angle formed by said transparent plates at a fourth summit of said lozenges.

5. Device according to claim 4, wherein said mirrors are maintained perpendicular to each other and one of the mirrors is kept parallel to the plane of symmetry of said transparent plates by two extension plates for each said mirror, said extension plates being attached to said mirrors at the front and rear angles near their free edge, in such a way that:

when said extension plates rest against a rod which constitutes a bottom summit of said lozenges, the extension plates maintain said mirrors in their reference positions, and when the extension plates belonging to the mirror perpendicular to the plane of symmetry of said transparent plates are lifted up and away from said rod, said mirror is folded against the transparent plate holding said camera.

6. Device according to claim 5, wherein the extension plates belonging to the mirror perpendicular to the plane of symmetry of said transparent plates carry on a lower edge several slots each, inside which end sections of said rod are positioned to maintain the angle formed by said transparent plates at one of several values, according to a width of the pages to be photographed.

7. Device according to claim 1, wherein the camera used is a digital camera providing a video output representing content of an image in a camera field of view, the video output is analyzed to detect a position of the page borders with respect to the camera field of view, providing information needed to adjust both centering of the camera optical axis on the page and the camera focal length to match the page size and the camera field of view.

8. A portable, foldable device to photograph pages of a book as part of a portable book reading machine for blind people, said device comprising:

a pivotal frame having two plates constituting together an angle comprised between about 60 and 120 degrees to hold the book sitting on top of said frame and said plates also being foldable together, said two plates including at least one plate being transparent and a first mirror mounted on said frame, a second mirror having an edge close to a free edge of one of said plates, said second mirror extending perpendicular to said first mirror, and an opening in said one plate to mount a photographic camera near the edge of the one plate close to said second mirror in such a way that an optical axis of the camera is perpendicular to the one plate and said camera being aimed by successive reflections on said second mirror and then said first mirror at the page of a book placed against the one plate holding the camera.

* * * * *